April 26, 1927.

G. V. BLACKFORD 1,625,785

AWNING FOR AUTOMOBILE DOORS

Filed July 3, 1926

Inventor
Gilbert V. Blackford

By Clarence A. O'Brien

Attorney

April 26, 1927.
G. V. BLACKFORD
1,625,785
AWNING FOR AUTOMOBILE DOORS
Filed July 3, 1926   2 Sheets-Sheet 2
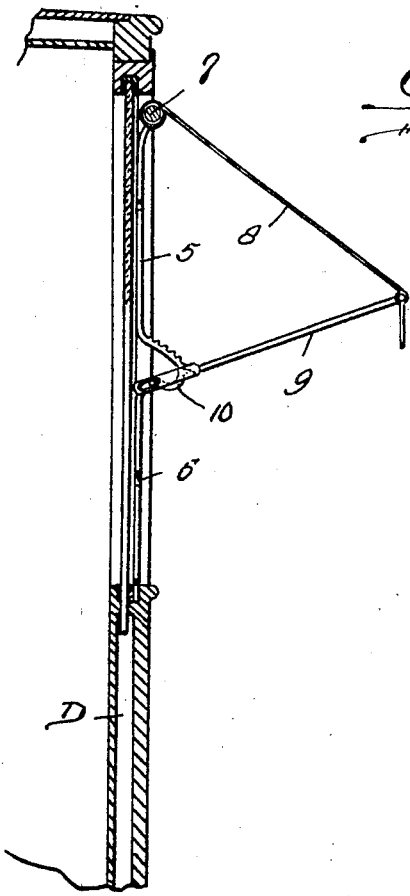
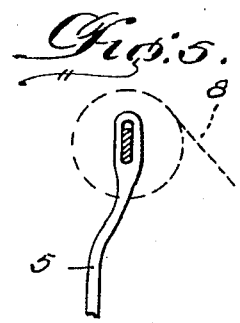
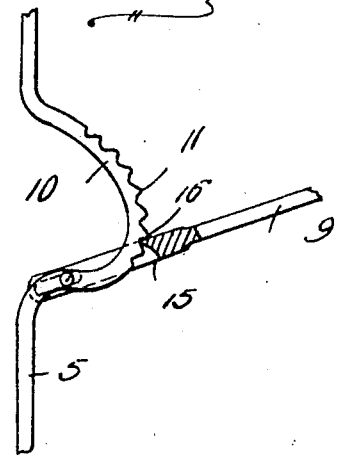
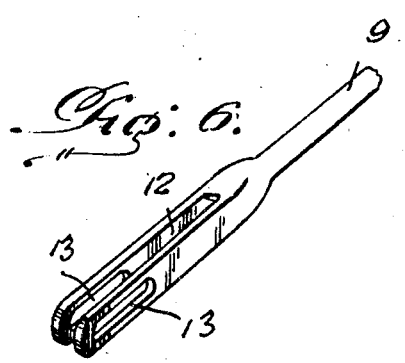
Inventor
Gilbert V. Blackford
By Clarence A. O'Brien
Attorney Patented Apr. 26, 1927.

1,625,785

UNITED STATES PATENT OFFICE.

GILBERT V. BLACKFORD, OF INDEPENDENCE, KANSAS, ASSIGNOR OF ONE-HALF TO WILLIAM R. HOBBS, OF INDEPENDENCE, KANSAS.

AWNING FOR AUTOMOBILE DOORS.

Application filed July 3, 1926. Serial No. 120,365.

This invention relates generally to automobiles of the closed type and has more particular reference to an awning construction for the doors thereof, the primary object of the invention residing in the provision of a device of this character that may be readily disposed within the window opening of a conventionally constructed automobile door so as to permit the door windows to be shaded if the occasion arises.

An additional object of the invention is to provide an awning construction of this character that may be readily disposed in place, and also readily removed, and that will in no way require any alteration of the automobile door and that will also not require the permanent attachment of brackets, arms, rods, or the like to the door, which will undoubtedly result in the marring thereof.

An additional object of the invention is to provide a device of this character wherein the awning fabric per se may be moved to shading position or readily raised and wherein the awning fabric may be extended outwardly to the desired position and there maintained.

Other objects will become apparent as the nature of the invention is better understood the same comprising the novel form, combination, and arrangement of parts hereininafter more fully described, shown in the accompanying drawing and claimed.

In the drawings:—

Figure 3 is a detail vertical section taken substantially upon the line 3—3 of Figure 1.

Figure 4 is an enlarged fragmentary view partly in side elevation and partly in cross section disclosing one side bar of the awning window attaching frame, and one side arm of an awning attached frame pivotally associated with said attaching frame, said bar and said arm being complementally constructed for retaining the awning attached frame to be retained at adjusted positions with respect to the attaching frame.

Figure 5 is a view of the upper end of one of the attaching frame arms formed with a vertical slot for receiving the flat pintle upon one end of a spring roller, and Figure 6 is an enlarged perspective of the inner end of one of the awning attached frame arms so constructed as to permit of the sliding pivotal attachment of the same to the adjacent bar of the awning attaching frame.

Now having particular reference to the drawings, A indicates a closed automobile body door constructed at its upper end with an open window frame B, within which is vertically slidable a window pane C, the door A being pocketed at D which is conventional for receiving the pane when the same is lowered.

Figure 2:
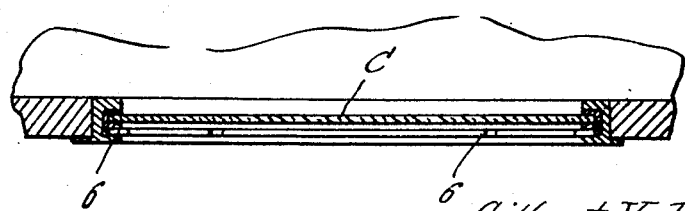
Figure 2 is a detail horizontal section taken substantially upon the line 2—2 of Figure 1.

In carrying out the present invention, I provide an attaching frame 5 in the formation of a generally U-shaped bar of an area substantially equivalent to the area of the inside of the window frame B of the door A. The vertical and horizontal bars of this frame are formed at a plurality of spaced points with outwardly extending tongues 6. The tongues of the lower horizontal bar of the frame are to be arranged within the usual horizontal channel at the top side of the door A outwardly of the usual packing therein, while the tongues of the vertical side bars are to be arranged within the usual channel of the sides of the window frame B, also outwardly of the packing strips therein as clearly indicated in Figures 2 and 3.

Figure 1:
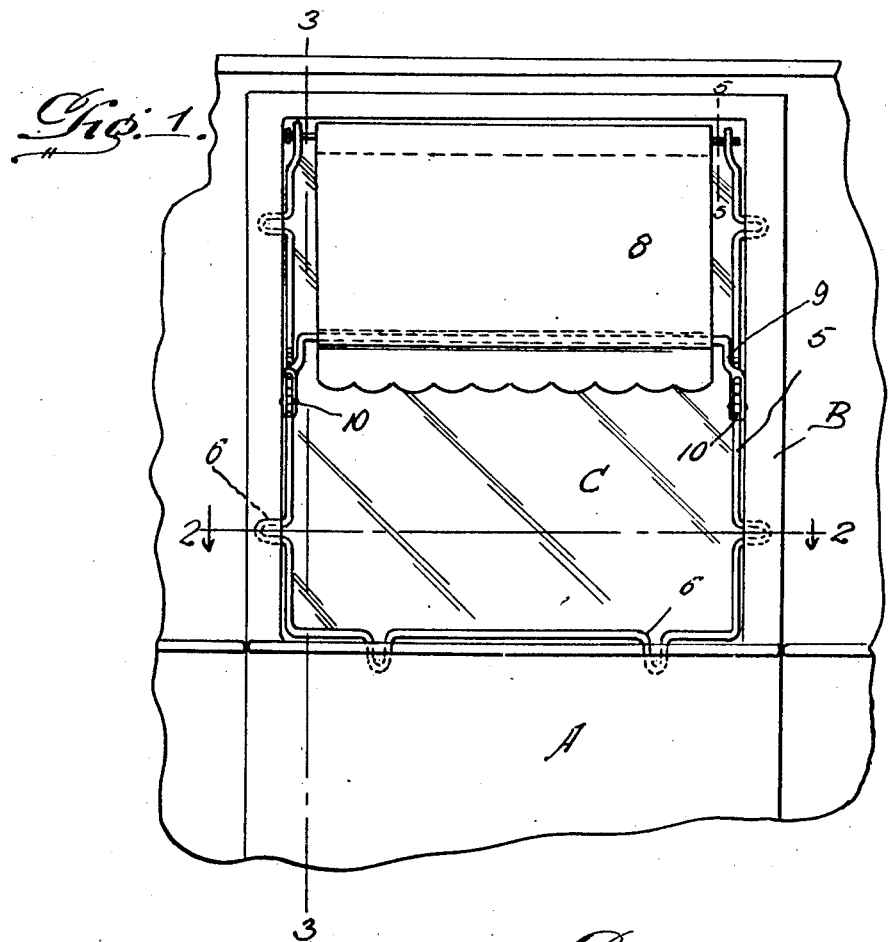
Figure 1 is a fragmentary side elevation of a closed automobile body, the particular door disclosed being equipped with an awning arrangement constructed in accordance with the present invention.

The upper ends of the side bars of the frame are formed respectively with a vertical slot and a circular opening for receiving respectively the flat and rounded pintles at the opposite ends of a spring roller 7 mounted between the bars of the frame as clearly disclosed in Figures 1 and 3. This spring roller is generally similar to the usual spring shade roller, only in the present instance no means is provided for preventing the forced rotation of the same under the influence of the usual spring therein. In other words, the normal tendency of the roller is at all times to rotate in a winding direction.

Attached to this roller is one end of a flexible awning strip 8, the outer end of which is attached to the horizontal cross bar of a relatively U-shaped frame 9.

Intermediate the ends of the vertical bars of the attaching frame 5 the same are so bent as to provide forwardly extending nose members 10—10, upon the outer surface of the inclined portions of which are ratchet teeth 11.

The inner ends of the side arms of the frame 9 are of square shape and longitudinally bifurcated as at 12, the inner ends of the bifurcations being longitudinally slotted as at 13—13. The bifurcated ends of the arms of said frame 9 are arranged over the nose members 10—10 of the vertical bars of the frame 5 and are slidably pivotally connected to the bottoms of the nose members by horizontal pivot pins 14 that extend through the bars of the frame member 5, and through the slots 13—13 of the bifurcations at the inner ends of the arms of the frame 9.

At the inner end of the bifurcations of each arm of the frame 9 the material forming the arm is so beveled as at 15 to provide a ratchet teeth engaging lip 16 which will engage beneath the teeth 11 of the nose members 10 when the frame 9 is pushed inwardly for maintaining the awning strip 8 in the desired extended position. Obviously by drawing outwardly upon the frame 9, the lip 16 will be disengaged from the ratchet teeth whereupon the awning shade will be wound upon the roller.

In view of the foregoing description when considered in conjunction with the accompanying drawing it will at once be apparent that I have provided a highly novel, and efficient form of shade construction for automobile body doors that is well adapted for all the purposes heretofore designated, and even though I have herein shown and described the most preferred embodiment of the invention with which I am at this time familiar, it is nevertheless to be understood that other modifications may be had without effecting the spirit and scope of the appended claims.

Having thus described the invention, what I claim as new and desire to secure by Letters Patent is:—

1. In an awning construction for automobile doors, wherein the same includes a window frame, the sides and bottom of which are channeled, a relatively U-shaped wire frame adapted for removable disposition within the window frame of the door, outwardly extending tongues formed on the arms and base portion of the U-shaped frame and adapted to fit in the channeled sides and bottom respectively of the window frame, and a curtain supported in the U-shaped frame.

2. In an awning construction for automobile doors, wherein the same includes a window frame, the sides and bottom of which are channeled, a relatively U-shaped wire frame adapted for removable disposition within the window frame of the door, outwardly extending tongues formed on the arms and base portion of the U-shaped frame and adapted to fit in the channeled sides and bottom respectively of the window frame, a spring roller journaled for rotation between the upper ends of the arms of the U-shaped frame, a curtain attached at one end to the roller and adapted to be normally wound therearound, and an additional U-shaped frame, the free end of the curtain being secured to the crown portion of said frame, the ends of the arms of the second mentioned U-shaped frame being pivotally secured to the respective arms of the first mentioned U-shaped frame, and means for holding the pivoted frame in various adjusted positions with respect to the stationary frame.

3. In an awning construction for automobile doors, wherein the same include a window frame, a relatively U-shaped frame adapted for removable disposition in the window frame of the door, forwardly extending nose members formed on the arms of the U-shaped frame, ratchet teeth formed on the outer edge of the nose, a spring roller journaled for rotation between the upper ends of the arms of said U-shaped frame, a curtain attached at one end to the roller and adapted to be normally wound therearound, a second U-shaped frame, the other end of the curtain being attached to the crown portion of the second U-shaped frame, the free ends of the arms of the second U-shaped frame being bifurcated and pivotally secured to the respective arms of the first mentioned frame at a point directly below the nose members, a ratchet teeth engaging lip formed at the inner end of each of the bifurcated portions of said second frame for holding the pivoted frame in various adjusted positions with respect to the stationary main frame, said second frame being adapted for outward sliding movement to disengage the lip from the ratchet teeth and permit the curtain to be wound around the spring roller.

In testimony whereof I affix my signature.

GILBERT V. BLACKFORD.